(12) United States Patent
Cheng

(10) Patent No.: US 12,038,166 B1
(45) Date of Patent: Jul. 16, 2024

(54) LUMINOUS CARD WITH NON-CONTACT INDUCTION CHARGING

(71) Applicant: ANICA CORPORATION, New Taipei (TW)

(72) Inventor: Meng-Jen Cheng, New Taipei (TW)

(73) Assignee: ANICA CORPORATION, New Taipei (TW)

( * ) Notice: Subject to any disclaimer, the term of this patent is extended or adjusted under 35 U.S.C. 154(b) by 0 days.

(21) Appl. No.: 18/324,170

(22) Filed: May 26, 2023

(51) Int. Cl.
  G06K 19/07 (2006.01)
  F21V 23/02 (2006.01)
  F21V 33/00 (2006.01)
  H02J 50/10 (2016.01)
  F21Y 115/10 (2016.01)

(52) U.S. Cl.
  CPC ........ F21V 33/0004 (2013.01); F21V 23/023 (2013.01); G06K 19/0723 (2013.01); H02J 50/10 (2016.02); *F21V 2200/00* (2015.01); *F21Y 2115/10* (2016.08)

(58) Field of Classification Search
  CPC ............... F21V 33/0004; F21V 23/023; F21V 2200/00; H02J 50/10; G06K 19/0723; F21Y 2115/10

USPC ........................................................ 235/380
See application file for complete search history.

(56) References Cited

U.S. PATENT DOCUMENTS

| 2011/0147461 A1* | 6/2011 | Chen ................. | G06K 19/07703 235/488 |
| 2015/0097037 A1* | 4/2015 | Narendra .......... | G06K 19/07749 235/492 |
| 2019/0244210 A1* | 8/2019 | Cheng ............... | G06K 19/07705 |
| 2023/0214627 A1* | 7/2023 | Coleman .......... | G06K 19/07707 235/451 |

* cited by examiner

*Primary Examiner* — Daniel A Hess

(57) ABSTRACT

A luminous card with non-contact induction charging includes a card body, a non-contact sensing module, a voltage stabilization module, a charging module, a distribution module, a recognition module, and a light-emitting module. Through the combination of the non-contact sensing module, voltage stabilization module, charging module, and distribution module, electrical power is transmitted to the recognition module and the light-emitting module when the card body is used. The light-emitting module guides the light source to the card body, enabling the display of usage messages on the card body. This achieves the utilization of acquired power through non-contact units, while also providing visual effects that are both informative and aesthetically pleasing.

5 Claims, 3 Drawing Sheets

LUMINOUS CARD WITH NON-CONTACT INDUCTION CHARGING

BACKGROUND OF THE INVENTION

1. Field of the Invention

The present disclosure relates to a transaction card, and in particular to a luminous card with non-contact induction charging.

2. Description of the Related Art

Portable cards commonly used in general (e.g., financial cards, credit cards, stored-value cards, EasyCards, health insurance cards, or individual certificates) lack mechanisms to provide prompts to consumers. As a result, during transactions, consumers typically rely solely on the merchant's notification to determine whether the transaction is completed, without the ability for the card itself to indicate its transaction status. This situation leads to the possibility of unscrupulous merchants using relevant devices to steal personal and transaction data from the radio frequency identification (RFID) tags within the card, either after or during the transaction process.

Therefore, a key focus of the present disclosure is to provide a luminous card with non-contact induction charging. This aims to utilize the acquired power through non-contact means for usage while providing both informative prompts and visually pleasing effects. By doing so, the present disclosure effectively addresses the existing shortcomings in commonly used cards.

BRIEF SUMMARY OF THE INVENTION

In view of the above drawbacks of the prior art, with extensive research and development to overcome these drawbacks, the present disclosure provides a luminous card with non-contact induction charging, aiming to achieve not only transaction prompts but also aesthetically pleasing visual effects during transactions.

To achieve the aforementioned objectives and other purposes, the present disclosure provides a luminous card with non-contact induction charging comprising a card body, a non-contact sensing module, a voltage stabilization module, a charging module, a distribution module, a recognition module, and a light-emitting module. The card body is equipped with at least one transparent portion. The non-contact sensing module is located within the card body and obtains power in a non-contact manner from a reading module. The voltage stabilization module is situated within the card body and electrically connected to the non-contact sensing module. The voltage stabilization module receives the power acquired by the non-contact sensing module, adjusts the voltage, and transmits it. The charging module is positioned within the card body and electrically connected to the voltage stabilization module. The charging module receives the transmitted power from the voltage stabilization module, stores it, and transfers it. The distribution module is located within the card body and electrically connected to the charging module. The distribution module receives and distributes the transmitted power from the charging module. The recognition module is situated within the card body and electrically connected to the distribution module. The recognition module receives power from the distribution module, exchanges data with the reading module, and generates at least one first drive signal or at least one second drive signal based on the data exchange result. The light-emitting module is positioned within the card body and electrically connected to the distribution module and the recognition module. The light-emitting module receives power from the distribution module and the first drive signal or the second drive signal from the recognition module. This enables the light-emitting module to emit different light sources, which are emitted through the transparent portion.

In the aforementioned luminous card with non-contact induction charging, the card body includes at least one first insulating plate, one second insulating plate, and one circuit carrier. The circuit carrier is positioned between the first insulating plate and the second insulating plate. The transparent portion is located on at least the first insulating plate. The non-contact sensing module, voltage stabilization module, charging module, distribution module, recognition module, and light-emitting module are situated on the circuit carrier.

In the aforementioned luminous card with non-contact induction charging, the non-contact sensing module is an electromagnetic induction element or a non-contact radio frequency antenna. The voltage stabilization module consists of diodes, capacitors, resistors, potentiometers, or their combinations. The charging module comprises rechargeable batteries, capacitors, or their combinations. The distribution module is, for example, a resistor. The recognition module is a chip that stores personal and transaction data. The light-emitting module consists of at least one light-emitting diode.

In the aforementioned luminous card with non-contact induction charging, the light-emitting module further includes a light guide portion and a light blocking portion. The light guide portion is positioned within the card body and corresponds to the light source path of the light-emitting module as well as the transparent portion. The light blocking portion is located around the light-emitting module and the light guide portion.

In the aforementioned non-contact induction charging luminous card, the light-emitting module further includes a light guide portion and three light-blocking portions. The card body has two transparent portions, one located on the top surface of the card body and the other located on the periphery of the card body. The light guide portion is located on the card body and corresponds to the light source path of the light-emitting module and the aforementioned transparent portions. One of the light-blocking portion is located on the periphery of the light-emitting module and on one side of the light guide portion, while the other two light-blocking portions are located on both sides of the light guide portion.

In the aforementioned luminous card with non-contact charging and sensing capabilities, there is further included a contact communication chip. The contact communication chip is electrically connected to the recognition module and is disposed on the card body with a portion exposed.

With the present disclosure of the non-contact induction charging luminescent card, the cooperation of the non-contact induction module, voltage stabilizing module, charging module, and current division module can transmit power to the recognition module and the light-emitting module when used on the body of the card through non-contact induction. The light-emitting module guides the light source to the transparent part so that the card can display usage information and achieve the use of non-contact power acquisition, while also providing a visually pleasing display effect.

DETAILED DESCRIPTION OF THE INVENTION

In order to fully understand the purpose, features, and effects of the present disclosure, the following specific embodiments are provided with reference to the accompanying drawings for a detailed description of the disclosure.

Figure 1:
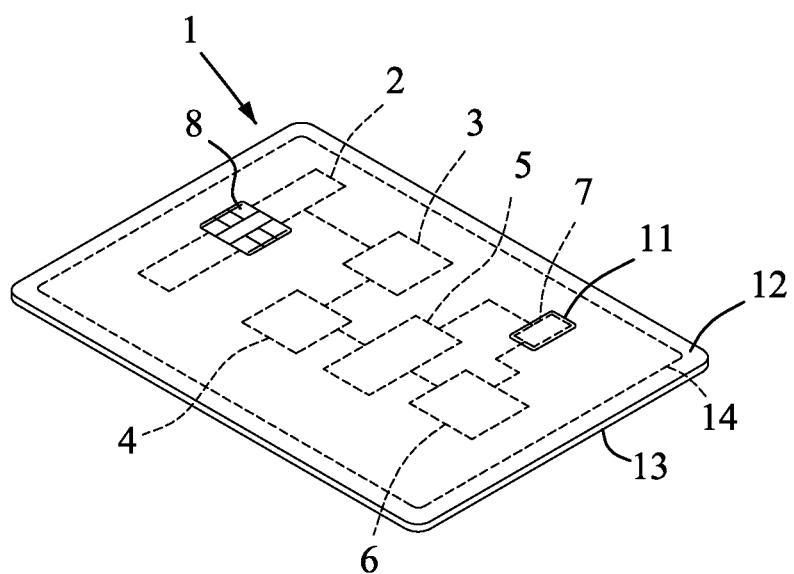
FIG. 1 is an external schematic diagram of a luminous card with non-contact induction charging according to an embodiment of the present disclosure.
Figure 2:
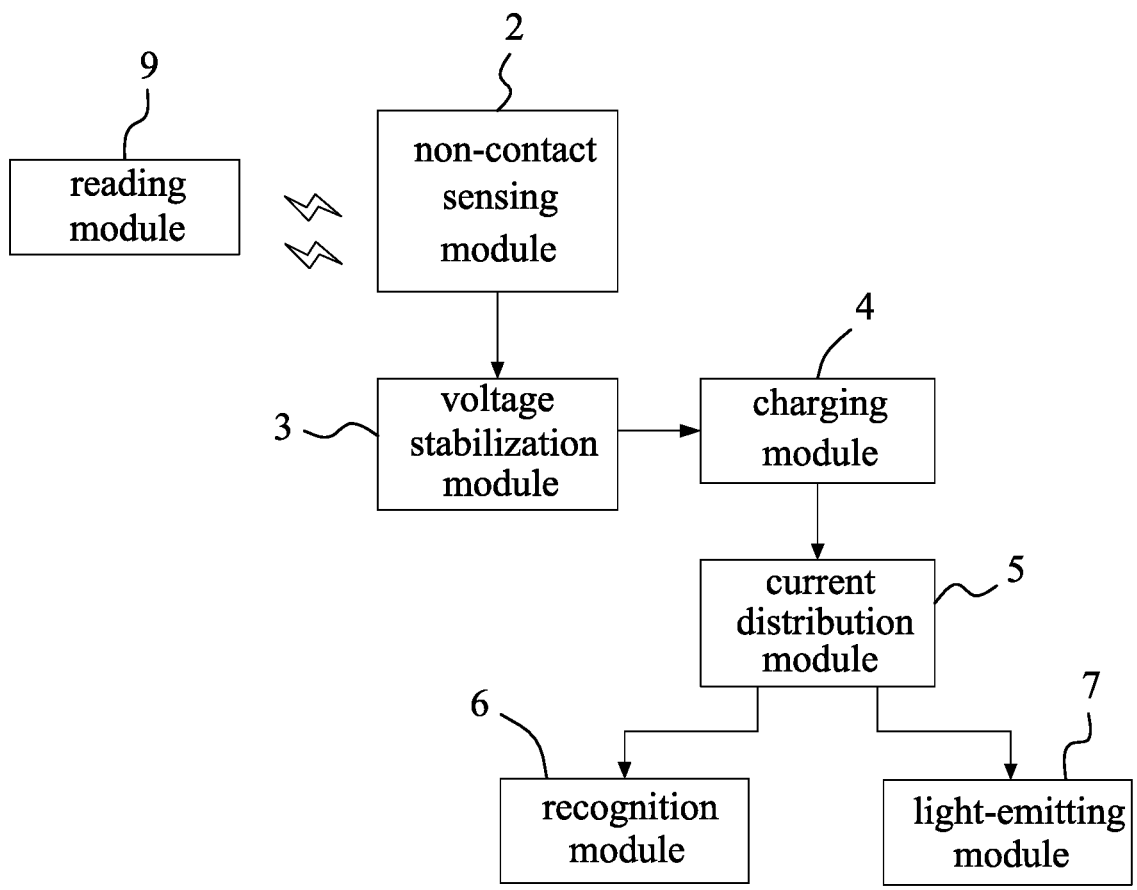
FIG. 2 is a block diagram of a luminous card with non-contact induction charging according to an embodiment of the present disclosure.
Figure 3:
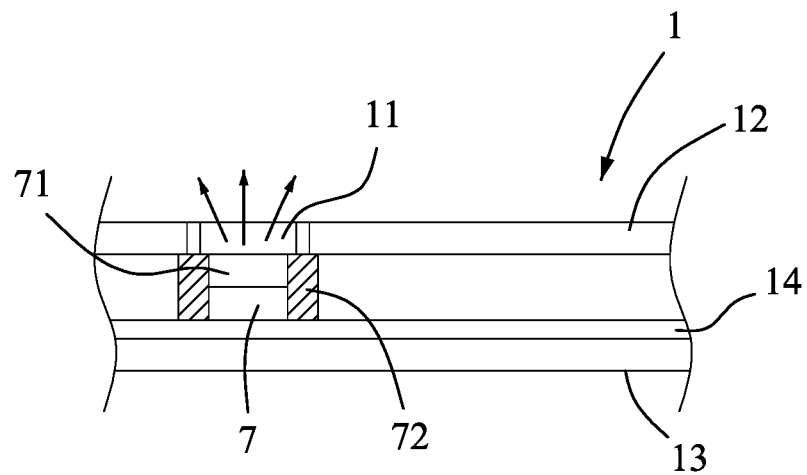
FIG. 3 is a cross-sectional schematic diagram of a luminous card with non-contact induction charging according to an embodiment of the present disclosure.

Please refer to FIGS. 1 to 3. As shown in the figures, the present disclosure provides a luminous card with non-contact charging. The card comprises at least a card body 1, a non-contact sensing module 2, a voltage stabilization module 3, a charging module 4, a current distribution module 5, a recognition module 6, and a light-emitting module 7.

The card body 1 is provided with at least one transparent portion 11, which may be a perforation. The card body 1 includes at least a first insulating plate body 12, a second insulating plate body 13, and a circuit carrying plate 14. The circuit carrying plate 14 is disposed between the first insulating plate body 12 and the second insulating plate body 13. The transparent portion 11 is at least provided on the first insulating plate body 12. The non-contact sensing module 2, the voltage stabilizing module 3, the charging module 4, the current splitting module 5, the recognition module 6, and the light-emitting module 7 are all disposed on the circuit carrying plate 14.

The non-contact sensing module 2 is located within the card body 1. The non-contact sensing module 2 obtains power from a reading module 9 in a non-contact manner. The non-contact sensing module 2 can be an electromagnetic induction component or a non-contact radio frequency antenna, in order to meet the practical requirements.

The voltage stabilization module 3 is located within the card body 1 and is electrically connected to the non-contact sensing module 2. The voltage stabilization module 3 receives the power obtained by the non-contact sensing module 2, adjusts the voltage, and then transmits it. The voltage stabilization module 3 can be, for example, a diode, capacitor, resistor, potentiometer, or a combination of these, to meet practical application requirements.

The charging module 4 is located within the card body 1 and is electrically connected to the voltage regulator module 3. The charging module 4 receives the power transmitted by the voltage regulator module 3, stores, and transfers the power accordingly. The charging module 4 can be, for example, a rechargeable battery, capacitor, or a combination thereof, in order to meet practical application requirements.

The distribution module 5 is located in the card body 1 and is electrically connected to the charging module 4. It receives and distributes the power transmitted by the charging module 4. The distribution module 5 may be, for example, a resistor, in order to meet the practical needs of the application.

The recognition module 6 is located in the card body 1 and is electrically connected to the distribution module 5. The recognition module 6 receives power from the distribution module 5 and exchanges data with the reading module 9. Based on the data exchange results, the recognition module 6 generates at least one first driving signal or at least one second driving signal. The recognition module 6 can be a chip that stores personal and transaction data to meet the requirements of actual use.

The light-emitting module 7 is installed in the card body 1 and electrically connected to the distribution module 5 and the recognition module 6. The light-emitting module 7 receives power from the distribution module 5 and the first or second driving signal from the recognition module 6, and emits different light sources through the light-transmitting portion 11. The light-emitting module 7 can be at least one light emitting diode, in order to meet the practical application requirements.

When the card body 1 is used, it can be brought close to the reading module 9 so that the contactless sensing module 2 can obtain power from the reading module 9. The voltage is then adjusted through the stabilizing module 3 and transmitted to the charging module 4. The charging module 4 then transfers the power to the distribution module 5, which distributes the power to the recognition module 6 and the light-emitting module 7. The recognition module 6 and the reading module 9 exchange data and generate a first driving signal (e.g. identification result is normal) or a second driving signal (e.g. identification result is abnormal) based on the data exchange result. The light-emitting module 7 receives the first driving signal or the second driving signal from the recognition module 6, and emits different light sources from the light-transmitting portion 11. For example, it emits a green light source when it receives the first driving signal, and a flashing red light source when it receives the second driving signal. This notifies the user of the usage information of the card body 1. When the card body 1 is moved away after use, the contactless sensing module 2 cannot read the electromagnetic waves from the reading module 9, resulting in a power failure. This causes the stabilizing module 3, charging module 4, distribution module 5, recognition module 6, and light-emitting module 7 to be in a closed state. Therefore, the card body 1 can be used by utilizing the power obtained through a contactless method, and has both usage prompts and a beautiful visual effect.

In addition to the embodiments mentioned above, in an embodiment of the present disclosure, the light-emitting module 7 further includes a light guide portion 71 and a light-blocking portion 72. The light guide portion 71 is set on the card body 1 and corresponds to the light source path of the light-emitting module 7 and the light transmission portion 11. The light-blocking portion 72 is set on the periphery of the light-emitting module 7 and the light guide portion 71. The light guide portion 71 can be made of, for example, transparent PVC, PET, PC, or PMMA depending on the requirements, and the light-blocking portion 72 can be a partially or completely opaque shielding layer, or a pattern layer as needed, to make the card body 1 more suitable for actual needs.

Based on the above implementation examples, when the light source of the light-emitting module 7 is emitted, the shielding effect of the light-blocking portion 72 allows the light source to be effectively guided by the light guide portion 71 to the light-transmitting portion 11. The light guide portion 71 also enhances the light source effect of the light-emitting module 7, allowing the display light source of the card body 1 to inform the user of the usage status, while also providing both informative and aesthetically pleasing visual effects.

In addition to the above embodiments, in an embodiment of the present disclosure, there is further provided a contact-type communication chip 8, which is electrically connected to the recognition module 6. The contact-type communication chip 8 is disposed in the card body 1 and partially exposed so that it can obtain power in a contact manner from the reading module 9, and exchange personal and transaction data to carry out transactions.

Figure 4:
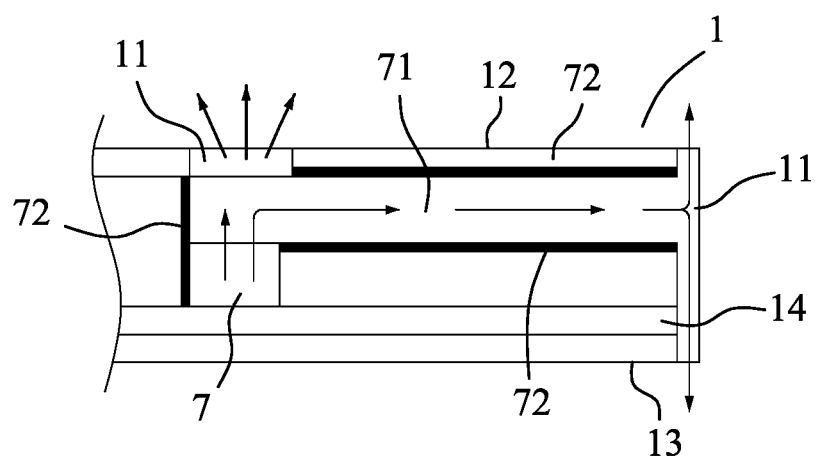
FIG. 4 is a cross-sectional schematic diagram of a luminous card with non-contact induction charging according to an embodiment of the present disclosure.

Please refer to FIG. 4, as shown in an embodiment of the present disclosure, the light-emitting module 7 further includes a light guide portion 71 and three light-blocking portions 72. The card body 1 has two transparent portions 11, one of which is located on the top surface of the card body 1, and the other is located on the periphery of the card body 1. The light guide portion 71 is located on the card body 1 and corresponds to the light source path of the light-emitting module 7 and the transparent portions 11. One of the light-blocking portions 72 is located on the periphery of the light-emitting module 7 and on one side of the light guide portion 71, while the other two light-blocking portions 72 are located on both sides of the light guide portion 71.

Based on the above embodiment, when the light-emitting module 7 emits light, the light can be effectively guided by the light guide portion 71 and directed to the transparent portion 11 by the shielding of the light-blocking portions 72. The light guide portion 71 also enhances the light source effect of the light-emitting module 7, enabling the card body 1 to emit display light sources from both the top surface and the periphery, informing the user of the usage status of the card body 1, and achieving both functional and aesthetic visual effects.

The present disclosure is disclosed by way of the preferred embodiments above. A person skilled in the art should understand that, these embodiments are merely for illustrating the present disclosure and are not to be construed as limitations to the scope of the present disclosure. It should be noted that all equivalent changes, replacements and substitutions made to the embodiments are encompassed within the scope of the present disclosure. Therefore, the scope of legal protection of the present disclosure should be defined by the appended claims.

What is claimed is:

1. A luminous card with non-contact induction charging, comprising:
   a card body with at least one transparent portion;
   a non-contact sensing module located within the card body, the non-contact sensing module obtaining power from a reading module in a non-contact manner;
   a voltage stabilizing module located within the card body and electrically connected to the non-contact sensing module, the voltage stabilizing module receiving and adjusting power obtained by the non-contact sensing module before transmitting it;
   a charging module located within the card body and electrically connected to the voltage stabilizing module, the charging module receiving and storing power transmitted by the voltage stabilizing module before transmitting it;
   a distribution module located within the card body and electrically connected to the charging module, the distribution module receiving and distributing power transmitted by the charging module;
   a recognition module located within the card body and electrically connected to the distribution module, the recognition module receiving power from the distribution module and exchanging data with the reading module, and generating at least one first drive signal or at least one second drive signal based on results of the data exchange; and
   a light-emitting module located within the card body and electrically connected to the distribution module and the recognition module, the light-emitting module receiving power from the distribution module and the first or second drive signal from the recognition module, so as to emit different light sources and project them from the transparent portion,
      wherein the card body comprises at least a first insulation board, a second insulation board, and a circuit substrate disposed between the first insulation board and the second insulation board;
      wherein the transparent portion is at least located on the first insulation board; and
      wherein the non-contact sensing module, voltage stabilizing module, charging module, distribution module, recognition module, and light-emitting module are all positioned on the circuit substrate.

2. The luminous card with non-contact induction charging, according to claim 1,
   wherein the non-contact sensing module is an electromagnetic induction component or a non-contact RF antenna;
   wherein the voltage stabilizing module is a diode, capacitor, resistor, potentiometer, or a combination thereof;
   wherein the charging module is a rechargeable battery, capacitor, or a combination thereof;
   wherein the distribution module is a resistor;
   wherein the recognition module is a chip storing personal and transaction data; and
   wherein the light-emitting module comprises at least one light-emitting diode.

3. The luminous card with non-contact induction charging, according to claim 1, further comprising:
   a contact communication chip, the contact communication chip is electrically connected to the recognition module and is positioned within the card body, and partially exposed.

4. A luminous card with non-contact induction charging, comprising:
   a card body with at least one transparent portion;
   a non-contact sensing module located within the card body, the non-contact sensing module obtaining power from a reading module in a non-contact manner;
   a voltage stabilizing module located within the card body and electrically connected to the non-contact sensing module, the voltage stabilizing module receiving and adjusting power obtained by the non-contact sensing module before transmitting it;
   a charging module located within the card body and electrically connected to the voltage stabilizing module, the charging module receiving and storing power transmitted by the voltage stabilizing module before transmitting it;
   a distribution module located within the card body and electrically connected to the charging module, the distribution module receiving and distributing power transmitted by the charging module;

a recognition module located within the card body and electrically connected to the distribution module, the recognition module receiving power from the distribution module and exchanging data with the reading module, and generating at least one first drive signal or at least one second drive signal based on results of the data exchange; and a light-emitting module located within the card body and electrically connected to the distribution module and the recognition module, the light-emitting module receiving power from the distribution module and the first or second drive signal from the recognition module, so as to emit different light sources and project them from the transparent portion;

wherein the luminous module further comprises a light guide portion and a light-blocking portion;

wherein the light guide portion is located in the card body and corresponds to a light path of the light-emitting module as well as the transparent portion; and wherein the light-blocking portion is positioned at the periphery of the light-emitting module and the light guide portion.

5. A luminous card with non-contact induction charging, comprising:

a card body with at least one transparent portion;

a non-contact sensing module located within the card body, the non-contact sensing module obtaining power from a reading module in a non-contact manner;

a voltage stabilizing module located within the card body and electrically connected to the non-contact sensing module, the voltage stabilizing module receiving and adjusting power obtained by the non-contact sensing module before transmitting it;

a charging module located within the card body and electrically connected to the voltage stabilizing module, the charging module receiving and storing power transmitted by the voltage stabilizing module before transmitting it;

a distribution module located within the card body and electrically connected to the charging module, the distribution module receiving and distributing power transmitted by the charging module;

a recognition module located within the card body and electrically connected to the distribution module, the recognition module receiving power from the distribution module and exchanging data with the reading module, and generating at least one first drive signal or at least one second drive signal based on results of the data exchange;

a light-emitting module located within the card body and electrically connected to the distribution module and the recognition module, the light-emitting module receiving power from the distribution module and the first or second drive signal from the recognition module, so as to emit different light sources and project them from the transparent portion; and a light guide portion and three light-blocking portions in the light-emitting module;

wherein the card body is equipped with two transparent portions, with one located on a top surface of the card body and the other on the periphery;

wherein the light guide portion is positioned in the card body and corresponds to a light source path of the light-emitting module and the transparent portions; and wherein one of the light-blocking portions is situated at the periphery of the light-emitting module and on one side of the light guide portion, while the other two light-blocking portions are located on two sides of the light guide portion.

\* \* \* \* \*